United States Patent

Sick

[11] 3,744,915
[45] July 10, 1973

[54] PHOTOELECTRIC LENGTH MEASURING APPARATUS

[76] Inventor: Erwin Sick, Stifterweg 6, 8021 Icking/Isartal, Germany

[22] Filed: Dec. 13, 1971

[21] Appl. No.: 206,548

[30] Foreign Application Priority Data
Dec. 12, 1970 Germany.................. P 20 61 235.5

[52] U.S. Cl................ 356/160, 356/159, 356/167, 250/219 WD, 250/219 LG
[51] Int. Cl. ......................................... G01b 11/04
[58] Field of Search.................. 356/159, 160, 167, 356/4; 250/219 WD, 219 LG

[56] References Cited
UNITED STATES PATENTS
3,615,139  10/1971  Boström.............................. 356/160
FOREIGN PATENTS OR APPLICATIONS
1,281,153  10/1968  Germany........................... 356/159

Primary Examiner—Ronald L. Wibert
Assistant Examiner—Paul K. Godwin
Attorney—Darbo, Robertson, and Vandenburgh

[57] ABSTRACT

A beam from a light source traverses a first diaphragm having a slit therein and then a second diaphragm having different sized openings to form first and second partial beams. The two partial beams go through an inclined partially-transmission partially reflective mirror to a reflective rotor. The reflective rotor is positioned at the focal point of a parabolic reflector strip so that the light therefrom is projected at the focal plane of the strip. At the focal plane is a raster reflector and a cylinder lens. The cylinder lens projects the first partial beam across the area within which is the object to be measured. At the opposite side of that area is a reversing reflector. The reflected partial beams from the reversing reflector and the raster reflector go back via the parabolic reflector, the reflective rotor and the mirror to respective photoelectric receivers. The signal from the receiver getting the first partial beam opens an "and" gate for the period during which the first partial beam is blocked by the object. The light pulses from the second partial beam produce electrical pulses that go through the "and" gate for so long as it is open.

8 Claims, 4 Drawing Figures

PHOTOELECTRIC LENGTH MEASURING APPARATUS

BACKGROUND AND SUMMARY OF THE INVENTION

The invention relates to photoelectric length measuring apparatus containing a photoelectric scanning head with a reflector rotor for scanning a field of view containing the measured object and with pulse generating means which are synchronized and coupled in rigid phase to the scanning head.

In a known system of this kind (German Pat. specification No. 1,294,048), the pulse generating means comprises a magnetic recording medium, which rotates with the photoelectric scanning head and is associated with a stationary magnet head. The signal output of the photoelectric scanning head may be optionally connected to the magnet head so that in this kind of operation and by mounting light sources at defined positions in the field of view, pulses may be stored in the magnetic recording medium, thus enabling the system to be calibrated. In normal operation the photoelectric scanning head, which is in the form of a reflector rotor, scans the field of view containing the measured object. The pulses thus obtained drive a counter into which the magnetic recording medium pulses, picked off by the magnet head, are counted. A digital length measured value is thus obtained. This known system calls for a relatively complicated calibrating method. Among other features, the accuracy depends on the precision with which the angular position between the pulses stored on the recording medium and the reflector rotor respectively are maintained.

The prior art also discloses a system (British Pat. specification No. 1,088,910) in which a scanning light beam, which is adapted to describe a circular arc, scans a pointer which is provided with a reversal reflector. Pulse generating means in the form of a slit disc, which is photoelectrically scanned, corotate with the deflection means for the scanning light beam. This is also a system in which the counter, into which the slit disc pulses are counted, is driven by scanning pulses obtained when the pointer is detected. In this system, a pointer is scanned over a scale. A system of this kind is not suitable for scanning linear measured objects.

The prior art also discloses apparatus for adjusting a movable member, for example, for adjusting a machine tool table or slide, in which a roughly divided scale is associated with the moving member. A second scale with fine divisions is provided. The scales are synchronously scanned with optical means in order to compare the position of the two scales relative to each other, for example, by means of two scanning light beams which are reciprocated over one or more oscillating elements disposed along the scales. The pulses derived from the finely divided scale are fed into a counter. The pulse provided by the roughly divided scale drives a gate circuit which triggers a comparison of the counterposition with a reference count in setting means. If a deviation occurs a servomotor will be switched on which then causes the movable member to follow up into a desired position (Swiss Pat. specification No. 315,921). This system relates to digital setting means and not to apparatus for measuring any desired object. In particular, the citation mentioned hereinabove does not disclose the optical means for generating the pulses.

The object of the invention is to provide photoelectric length measuring means of the kind mentioned initially so that it is suitable for measurement of substantially any desired measured object within its field of view and that maladjustment of the pulse generating means relative to the scanning head cannot cause falsification of the measured result.

According to the invention this is achieved in that the scanning head contains (in known manner) a light source and an image-forming optical system for producing a scanning light beam which is conducted via the reflector rotor. The optical path of the scanning light beam has a first diaphragm disposed therein which diaphragm is partially displayed by the image-forming optical system on a raster reflector. Another part of the diaphragm image is disposed adjacent to the raster reflector to form a partial light beam which traverses over the field of view which is to be scanned. A second diaphragm, constructed as slit, is disposed in the optical path and is displayed by the image-forming optical system approximately in the plane of the reflector rotor. The partial light beam, reflected by the raster reflector is conducted to a first photoelectric receiver through a partially transmissive mirror which is inclined to the axis of the light beam. The partial light beam, traversing past the raster reflector and traversing over the scanned field of view is conducted to a second photoelectric receiver via a reversing reflector which forms the background of the field of view which is to be scanned.

In the system according to the invention, a light beam, deflected by the reflector rotor, scans the field of view and at the same time, namely by a partial light beam thereof, scans the raster reflector to produce a pulse sequence. This ensures that the pulses are accurately synchronized with the scanning motion. The inventive display of the diaphragms ensures that the raster reflector as well as the field of view are scanned with a correspondingly narrow light beam so that sharp pulses or signal flanks respectively are produced. In a preferred embodiment the first diaphragm contains a slit-shaped part, an image of which is displayed on the raster reflector, and a broadened aperture for the partial light beam which passes by the raster reflector. An image of the slit-shaped part of the first diaphragm is displayed on the raster reflector to ensure the production of sharp photo-electric pulses thereat. A broadened aperture is provided for the partial light beam which passes by the raster reflector since there is no need for scanning in the plane of the raster reflector and the broadened aperture permits the partial light beam, which passes by the raster reflector to have a higher light flux. This is very essential for scanning the field of view.

The scanning head may have a parabolic reflector strip at whose focal point the reflector rotor is disposed. The reflector rotor may be built up from spherical concave reflectors. Furthermore, a third photoelectric receiver may be disposed in the focal plane of the reflector strip to which the scanning light beam is directly conducted by the reflector rotor at the beginning of each scanning period to produce a reference signal.

DESCRIPTION OF SPECIFIC EMBODIMENT

Figure 1:
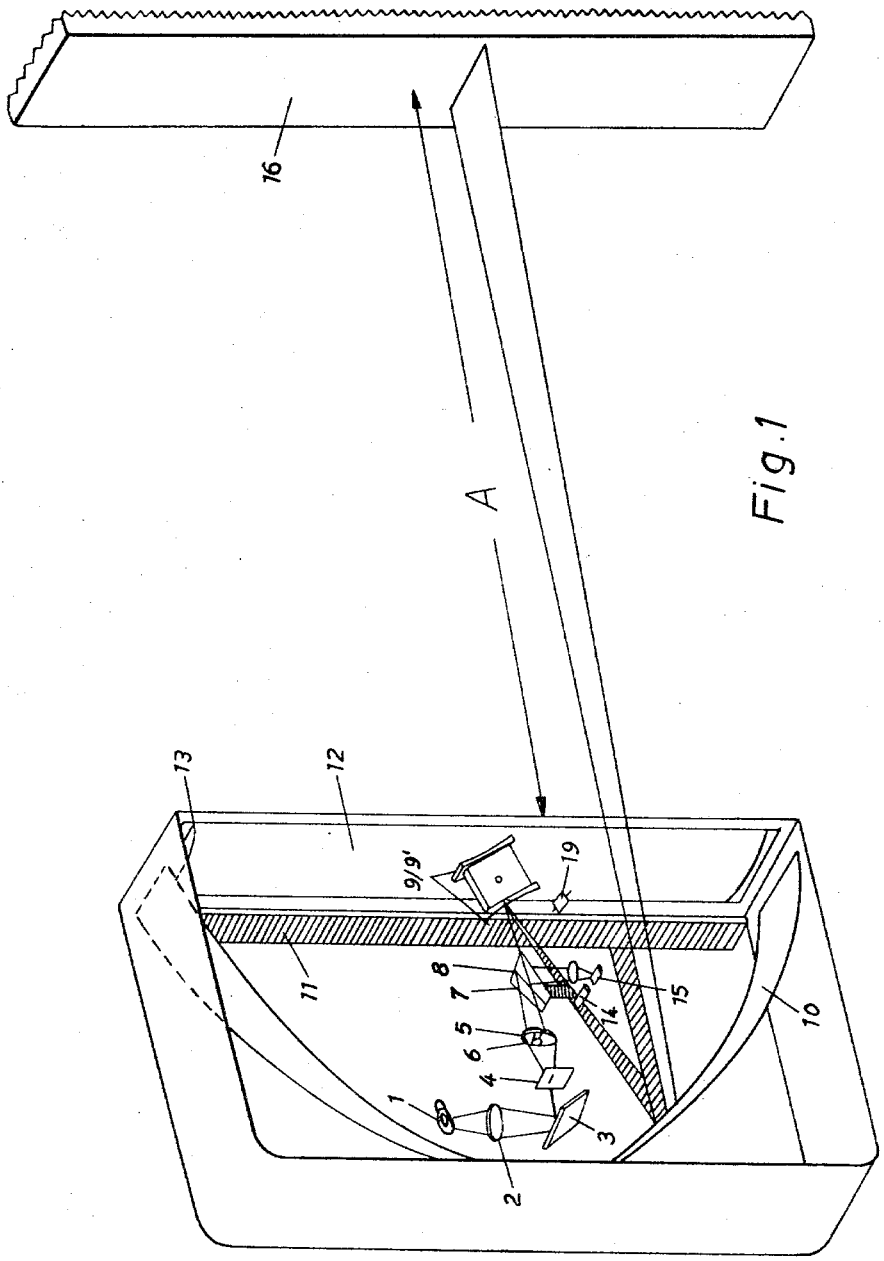
FIG. 1 is a perspective schematic view of photoelectric lens measuring means according to the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The light of an incandescent lamp 1 is concentrated by a condenser lens 2 and conducted via a deflecting mirror 3 to a diaphragm 4. An image of the lamp filament is produced on the diaphragm. The light passing through the diaphragm 4 is concentrated by a lens 5 and 50% of said light traverses a semi-reflective mirror 8 which is inclined at an angle to the axis of the light beam. The lens 5 displays an image of the diaphragm 4 on a concave reflector 9 of a reflector rotor (having two concave reflectors 9, 9' constructed as spherical reflectors). A contour diaphragm 6 is disposed in the aperture of the lens 5. The contour diaphragm 6 is also shown in FIG. 2.

After being deflected by the concave reflector 9, the light strikes a parabolic reflector strip 10, is once again reflected thereby and appears as image of the contour diaphragm 6 in the plane in which is disposed a raster reflector 11 and a light exit pupil 12.

Figure 2:
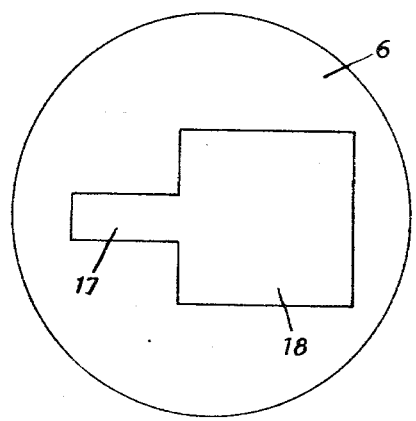
FIG. 2 shows a diaphragm utilized in this system.

The contour diaphragm 6 forms a narrow slit 17 and a broadened light exit aperture 18 (see FIG. 2). The image of the contour diaphragm is projected so that the narrow slit is displayed as an image on the raster reflector 11 while the broadened light transmission aperture 18 is disposed on the light exit pupil 12. Accordingly, two adjacently positioned light beams are produced: a partial light beam, produced by the slit 17, scans the raster reflector 11; and a partial light beam, produced by the light transmission aperture 18, scans the field of view in which the measured object is disposed.

The raster reflector 11 is provided with reflective and non-reflective zones sequentially positioned at identical distances from each other. The width of the reflecting or non-reflecting zones respectively corresponds to the width of the projected light slit 17 of the diaphragm 6. If the light of the aforementioned partial light beam strikes a reflecting zone of the raster reflector 11, the light will be reflected thereby and then passes via the parabolic reflector strip 10, the concave reflector 9 of the reflector rotor and the deflecting mirror 8 to a photoelectric receiver 14.

The light of the other partial light beam (i.e., from aperture 18) is concentrated by means of a cylinder lens 13, passes through the measuring zone A and strikes a reversing reflector 16. At this position the light beam is reflected into itself and returns through the cylinder lens 13 to the reflector strip 10. From the reflector strip 10 it is reflected by the concave reflector 9 to the partially transmissive reflector 8. At this position, 50% of the light reflected by the reversal reflector 16 is deflected to strike the photoelectric receiver 15.

When the reflector rotor which is mounted on a motor spindle and is provided with the reflectors 9 and 9' is set into rotation, a keying period and a dark period will be produced. Each period corresponds to an angle of rotation of the motor of 90°. A further photoelectric receiver 19 is briefly biased with light at the beginning of each keying period to supply a starting pulse. When the partial light beam emerging through the slit 17 traverses over the raster reflector during the keying period, the output of the photoelectric receiver 14 will supply electric pulses produced by the successive light and dark zones of the raster reflector 11. The number of said pulses corresponds to the number of bright zones on the raster reflector.

The partial light beam (from aperture 18) traverses the measuring field A from top to bottom (or bottom to top depending upon the rotation of reflectors 9, 9') of the reflector 16 as seen in FIG. 1. This is coincident with the keying period. An object to be measured disposed in the measuring zone A will cause a dark pulse to be produced on the photoelectric receiver 15 during the keying period. The period of that dark pulse will depend on the vertical dimension of the object (as seen in FIG. 1). The dark pulse causes the voltage at the output of the photoelectric receiver to collapse for the period of time of the dark pulse.

Figure 3:
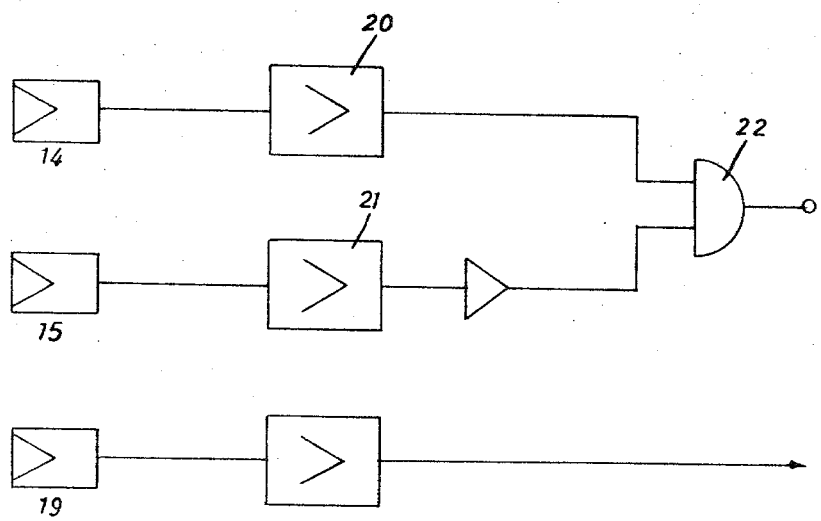
FIG. 3 is a diagrammatic representation of a circuit for processing the signal in the apparatus according to FIG. 1.
Figure 4:
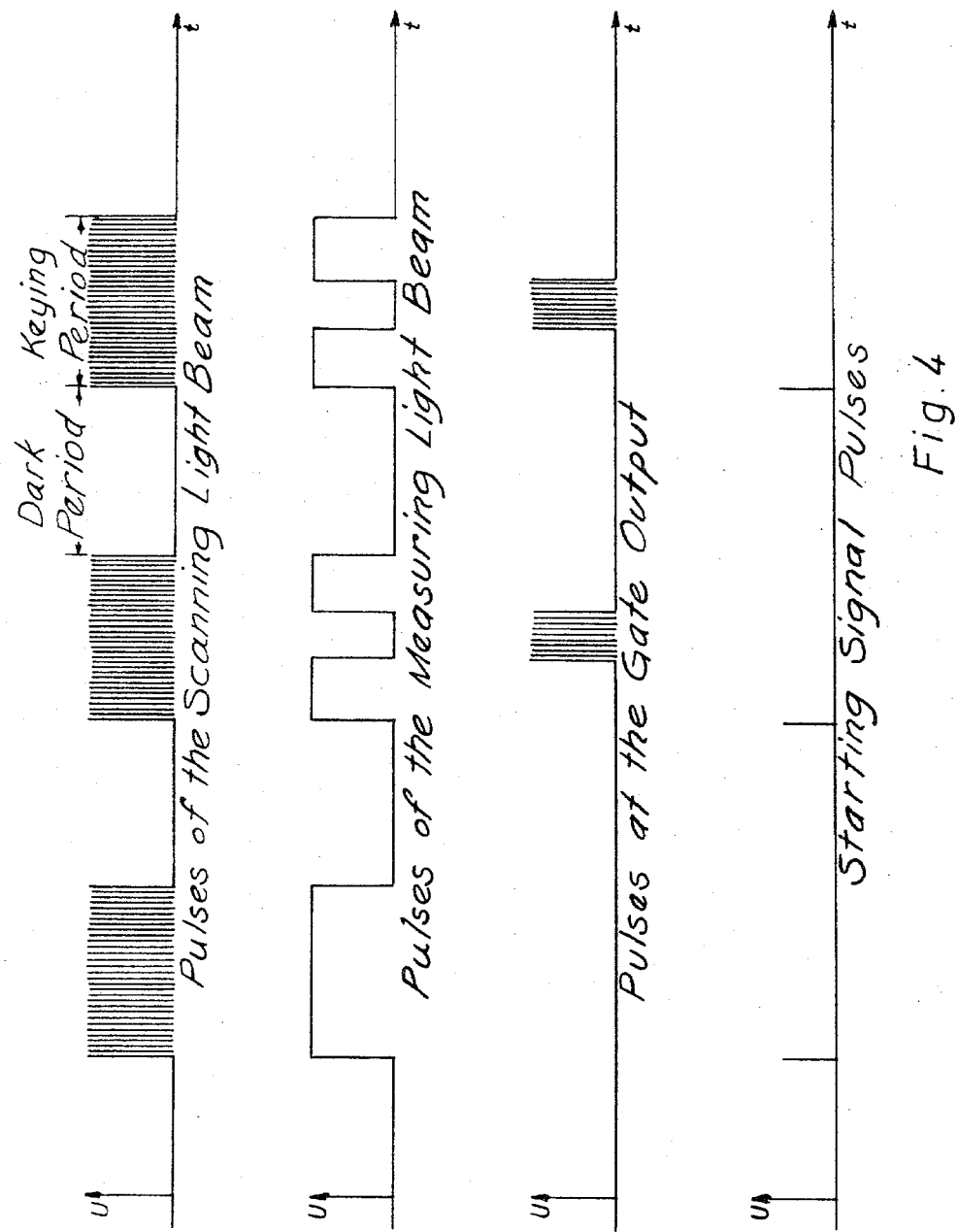
FIG. 4 is a series of diagrams showing the associated signal flows.

Referring to FIG. 3, each of the pulses of the photoelectric receivers 14 and 15 are amplified in preamplifiers 20 and 21 respectively, (each of which includes a pulse forming stage) and is then supplied to a gate circuit 22. The relative phases of the two signals is selected so that the pulses produced by the raster reflector 11 can pass through the gate circuit 22 only during the dark interval of the partial light beam which traverses over the field of view. The number of pulses which exit from the gate circuit will thus depend on the magnitude of the measured object (i.e., the number of bright zone pulses derived from raster reflector 11, and occurring during the dark zone produced by the measured object). The height of the measured object will be obtained from the distance of the raster reflector 11 corresponding to that number of raster bright zone pulses (i.e., the number of pulses multiplied by the height on the raster from an edge of one reflective zone to the corresponding edge of an adjacent reflective zone). The signal of the photoelectric receiver 19 is used to reset one counter for the said pulse sequences after each scanning operation.

I claim:

1. In a photoelectric length measuring apparatus for use in determining the length of an object positioned in a field of view, said apparatus comprising a light source, first means for forming a scanning light beam from light from said source and causing said beam to sweep across said field in a direction parallel to said length whereby a first portion of the scanning beam will traverse said field, a second portion will be intercepted by the object for a period of time corresponding to said length followed by a third portion of the scanning beam which will traverse said field, pulse generating means, and signal producing means to receive the first and third portions of the scanning beam and to produce a first signal when the light is intercepted at the end of the first portion and a second signal when the light is established at the beginning of the third portion, and computing means connected to said pulse generating means and to said signal producing means to determine said length of said object, the improvement comprising:
a raster reflector comprising a series of reflective and non-reflective areas positioned in sequence along a given line;
said first means forming two side by side partial beams a first of which forms said scanning beam and a second of which sweeps said raster reflector along said line, said first means including a first diaphragm constructed as a slit and positioned between said source and said field and said raster reflector, respectively, to form said two partial beams into beams as relatively narrow in the direction of said sweep;
said pulse generating means including a photoelectric receiver and optical means to direct the part of the second partial beam reflected from said raster reflector to said receiver.

2. In an apparatus as set forth in claim 1, wherein the first means includes, a reflector rotor, a partially reflective partially transmissive mirror positioned at an angle to the axis of the light beam between the diaphragm and the reflector rotor, said first means imaging said slit approximately at said reflector rotor, said signal producing means including a second photoelectric receiver, a reversing reflector positioned at the opposite side of said field from said first means for returning the first and third portions back on themselves through the reflector rotor and to said partially reflective partially transmissive mirror to said second photoelectric receiver.

3. In an apparatus as set forth in claim 2, wherein said first means includes a second diaphragm positioned between the first diaphragm and the reflector rotor, said second diaphragm having a first opening to pass said first partial beam and a second opening to pass said second partial beam, said first opening being larger than said second opening.

4. In an apparatus as set forth in claim 2, wherein said first means including a parabolic reflector strip having a focal point, said reflector rotor being positioned about at said focal point.

5. In an apparatus as set forth in claim 4, wherein said reflector rotor has a spherically concave reflector.

6. In an apparatus as set forth in claim 4, wherein said reflector strip has a focal plane, said raster reflector being positioned in said focal plane, a cylinder lens positioned in said focal plane beside said raster reflector.

7. In an apparatus as set forth in claim 6, including a third photoelectric receiver positioned in said focal plane at a position to receive a part of said scanning beam at the start of each sweep of said field to produce an electrical output signal for reference purposes.

8. In an apparatus as set forth in claim 4, wherein said reflector strip has a focal plane and including a third photoelectric receiver positioned in said focal plane at a position to receive a part of said scanning beam at the start of each sweep of said field to produce an electrical output signal for reference purposes.

* * * * *